Feb. 20, 1951     H. R. AMUNDSEN     2,541,979
FRICTION BRAKE AND CLUTCH
Filed Nov. 21, 1947     2 Sheets—Sheet 1
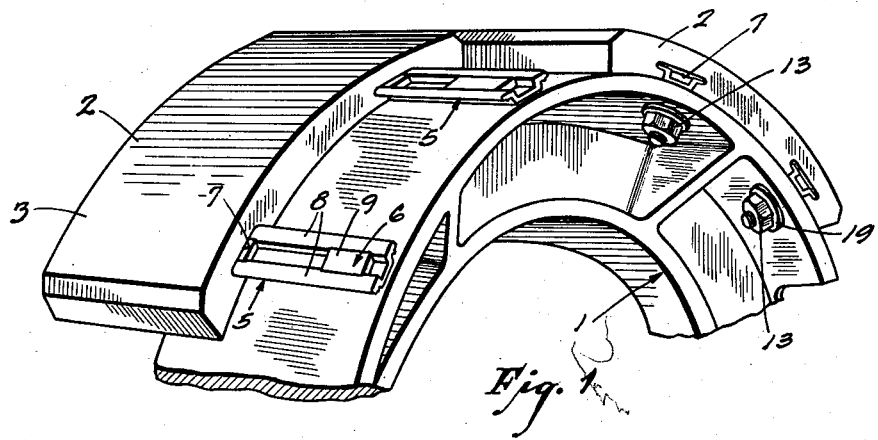
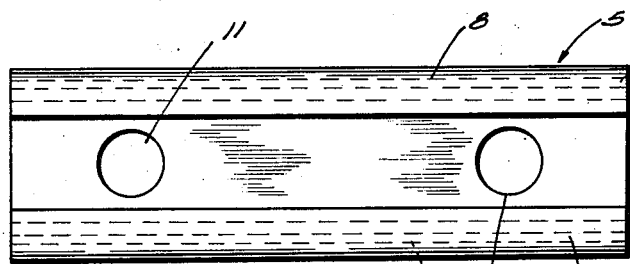
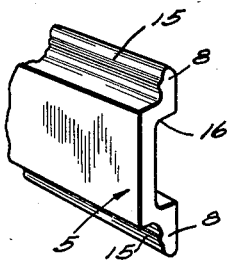
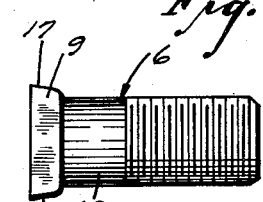
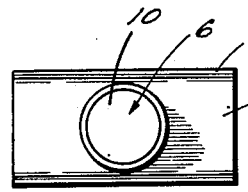
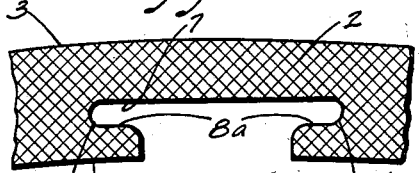
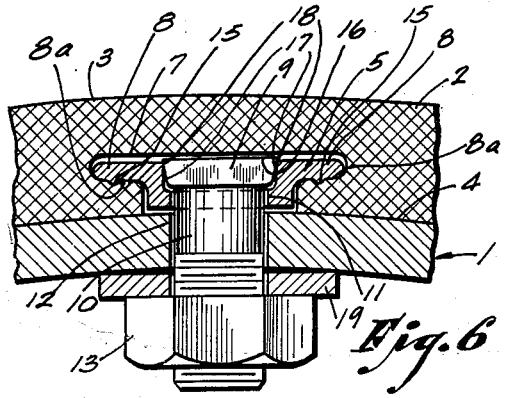
INVENTOR.
*Hans R. Amundsen*
BY *Thiess, Olson & Mecklenburger*
Att'ys Feb. 20, 1951  H. R. AMUNDSEN  2,541,979
FRICTION BRAKE AND CLUTCH
Filed Nov. 21, 1947  2 Sheets-Sheet 2
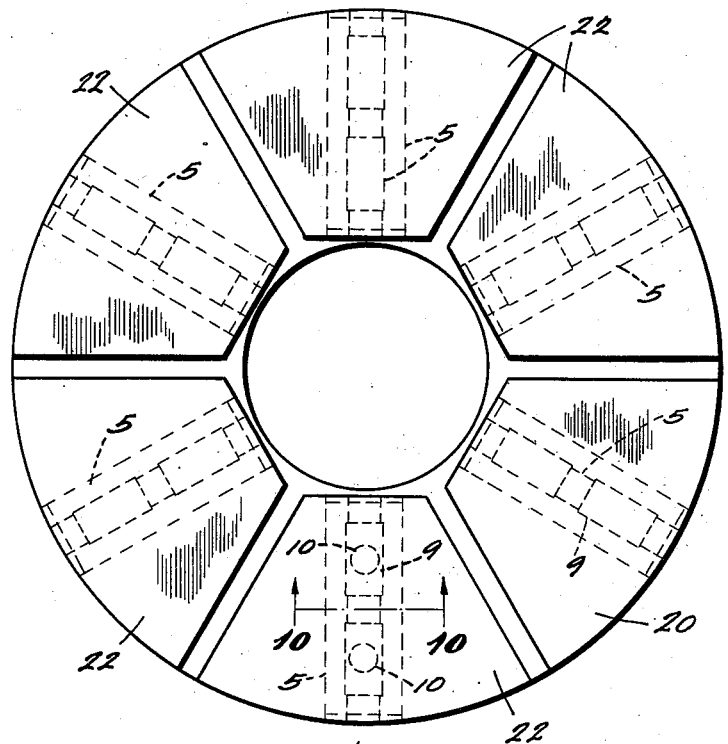
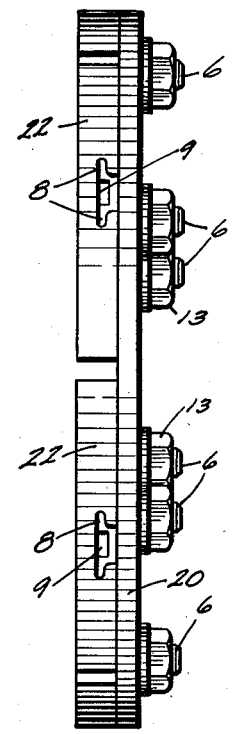
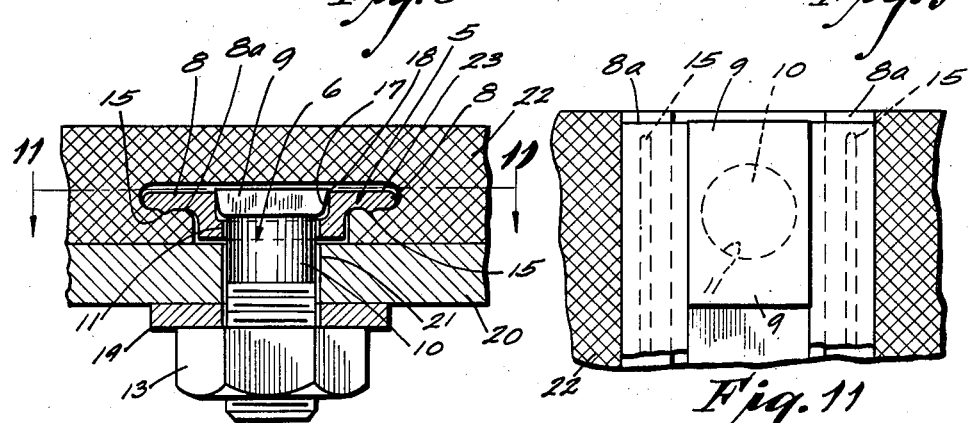
INVENTOR.
Hans R. Amundsen
BY
Thiess, Olson & Mecklenburger
Attys.

Patented Feb. 20, 1951

2,541,979

UNITED STATES PATENT OFFICE 2,541,979

FRICTION BRAKE AND CLUTCH

Hans R. Amundsen, Oak Park, Ill.

Application November 21, 1947, Serial No. 787,342

14 Claims. (Cl. 192—107)

My invention relates to friction brakes and clutches.

This invention is in the nature of an improvement or modification of the invention disclosed in my co-pending application Serial No. 651,536, filed March 2, 1946.

One of the objects of my invention is to provide an improved brake or clutch construction in which the brake or clutch blocks are secured to the shoe without the use of bolts or rivets in the friction material which will enable the removal and replacement of the blocks without removing the shoe from its place by means of an improved positioning and clamping strip of wedge-like channeled cross section.

A further object is to provide an improved construction in which the clamping strip is secured on the shoe and clamped in place to hold the block in position by means of headed bolts, the heads of which are seated in the channel.

A further object is to provide such an improved construction in which the bolts are prevented from turning by engagement of the heads of the bolts with the side flanges on the channeled clamping strips.

A further object is to provide such a construction in which the clamping strip is provided with a flange having a rib engaging a shoulder on the block in such a manner as to prevent a portion of the shoulder which may be broken off from escaping from underneath the flange and getting where it may damage the brake or clutch.

A further object is to provide such a construction in which the heads of the bolts engage the outer edges of the channel in the clamping strip, tending to spread the channel and hold the clamping strip against outward buckling action.

Further objects and advantages of the invention will be apparent from the description and claims.

In the drawings, in which two embodiments of my invention are shown,

Figure 1 is a perspective view showing a brake or clutch shoe, a plurality of brake or clutch blocks and clamping means for securing the blocks to the shoe;

Fig. 2 is a plan view of the clamping strip;

Fig. 3 is a perspective view of one end of the clamping strip;

Fig. 4 is a side elevation of the clamping bolt;

Fig. 5 is a view of Fig. 4 from the right;

Fig. 6 is a transaxial view showing the manner of securing the brake block to the shoe;

Fig. 7 is a transaxial view of a portion of the brake block;

Fig. 8 is a plan view showing a different form of brake or clutch shoe and friction block;

Fig. 9 is an edge elevational view of Fig. 8;

Fig. 10 is a cross sectional view on the line 10—10 of Fig. 8; and

Fig. 11 is a cross sectional view on the line 11—11 of Fig. 10.

Referring to the drawings in detail and first to Figs. 1–7, inclusive, the construction shown comprises a brake or clutch shoe 1 for an internal expanding brake or clutch and a plurality of asbestos combination friction blocks 2 having coaxial sectoral cylindrical face and back surfaces 3 and 4. The back surface 4 is engageable with the face of the shoe 1. The face surface 3 is a friction surface for frictionally engaging a complementary relatively rotatable cylindrical brake or clutch drum to check relative rotation between said surfaces.

A channel-like guiding and clamping strip 5 is provided for guiding and clamping the blocks 2 with respect to the shoe 1 having clamping bolts 6 for drawing the clamping strip 5 toward the shoe 1. Each block has a pair of dovetail grooves 7 in its back carrier engaging surface 4 extending longitudinally of the axis of the carrier or shoe 1 and extending completely across the back surface for engaging and receiving the guiding and clamping strip 5. The channel-like strip has laterally extending side flanges 8, the dovetail grooves 7 in the block having inwardly extending side shoulders 8a engageable with the flanges 8 of the clamping strip throughout the length of the strip. The heads 9 of the bolts 6 lie between the flanges 8 and engage the flanges 8 to hold the bolts against rotation. The shanks 10 of the bolts extend through openings 11 and 12 in the channel and shoe, respectively, and are provided with nuts 13 which are turned up to tighten the clamps 5 to secure the blocks 2 firmly in position on the shoe.

The engaging surfaces of said flanges 8 and shoulders 8a lie substantially in a plane parallel to the adjacent engaging surfaces of the brake block 2 and brake shoe 1. This avoids any wedging action which would tend to spread and crack the block. This avoidance of spreading action not only lessens the danger of splitting the brake block but also acts to hold the portions of the brake block in position in case it should become worn in two at the dovetail groove 7. In order to prevent endwise slipping of the friction blocks with respect to the clamping strips 5, the clamping strips are made slightly shorter than the length of the dovetail groove 7 so that the ends of the clamping strips and of the ribs 15 will imbed themselves in the material of the friction block to prevent slippage between the clamping strip and the brake block, as indicated in Figs. 6 and 11. As a further safeguard, the flange 8 is provided with a rib 15 extending longitudinally thereof which bites into the shoulder 8a as shown in Fig. 6, thus securely holding the portions of the block 2 in position even if it should become worn in two.

In order to counteract any tendency for the flanges 8 to buckle outwardly as the nut 13 is tightened up to draw the head 9 into the groove 16 in the clamping strip, the head 9 is given a wedge-like formation as indicated at 17 so that it will engage the outer edges of the channel 16 at 18, as shown in Fig. 6. This will tend to force the edges 18 away from each other and prevent buckling action of the flanges 8.

The radial depth of the groove 7 is somewhat greater than the radial height of the clamping strip 5, as shown in Fig. 6, whereby when the strip 5 is drawn toward the shoe 1 the shoe-engaging face 4 of the block will be clamped tightly against the shoe, leaving a substantial space between the shoe and clamping strip. A lock washer 19 may be provided between the nut and shoe.

Any suitable material may be used for the clamping strip 5. I have found in practice that extruded metal is satisfactory for this purpose. The bolts may be formed in any suitable manner, as by upsetting or swaging the head 9 so as to make it extend laterally in both directions from the axis of the bolt and fit snugly between the flanges of the channel-like strip.

With this construction, if a friction block 2 is worn out or damaged so that it has to be removed, this can be done, leaving the brake shoe or brake band the clamping strip 5 and bolts 6 in place by loosening the nuts 11 which hold the worn block in place and forcing the worn out block to slide laterally along the strips.

Parts of the construction of Figs. 8-11, inclusive, may be the same as in Figs. 1-7, inclusive. These similar parts include the clamping strip 5, the clamping bolts 6, the nuts 13, and the lock washers 19. In this construction the clamping strips 5 are secured to the circular brake or clutch plate 20 so as to extend radially with respect thereto, the strips 5 being secured to the plate by means of bolts 10 extending through the openings 11 in the clamping strips and through registering openings 21 in the block carrying plate 20, the nuts 13 being threaded onto the bolts 6 to effect the clamping action of the strips 5. In this form also the ribs 15 bite into the shoulders 8a. The engaging surfaces of the side flanges 8 and shoulders 8a lie in a plane substantially parallel to the engaging surfaces of the friction block 22 and the plate 20. In this form the sector-shaped friction blocks 22 are provided with dove-tail grooves 23 of T-shaped cross section to receive the clamping strips 5 and may be removed from the plate 20 by loosening up the nuts 13 sufficiently to free the flanges 8 from the shoulders 8a so that the blocks 22 may be slipped out in a radial direction to free them from the clamping strips.

Further modifications will be apparent to those skilled in the art and it is desired, therefore, that the invention be limited only by the scope of the appended claims.

Having thus described my invention, what I claim and desire to secure by Letters Patent is:

1. A clutch or brake construction comprising a friction block carrier, a friction block, a guiding and clamping beam-like strip for guiding and clamping said block to said carrier, and one or more screw-threaded clamping bolts for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip being substantially coextensive lengthwise with respect to said groove and having side flanges and said groove having inwardly extending side shoulders engageable with the flanges of said clamping strip, said flanges having longitudinally extending ribs for pressing into said shoulders to hold them in place in case the block becomes divided.

2. A clutch or brake construction comprising a friction block carrier, a friction block, a channel-like guiding and clamping beam-like strip for guiding and clamping said block to said carrier, and one or more screw-threaded clamping bolts for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip being substantially coextensive lengthwise with respect to said groove and having side flanges and said groove having inwardly extending side shoulders engageable with the flanges of said clamping strip, said flanges having longitudinally extending ribs for pressing into said shoulders to hold them in place in case the block becomes divided.

3. A clutch or brake construction comprising a friction block carrier, a friction block, a channel-like guiding and clamping beam-like strip for guiding and clamping said block to said carrier, and one or more screw-threaded clamping bolts having their heads seated in a channel-like strip for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip being substantially coextensive lengthwise with respect to said groove and having side flanges and said groove having inwardly extending side shoulders engageable with the flanges of said clamping strip, said flanges having longitudinally extending ribs for pressing into said shoulders to hold them in place in case the block becomes divided.

4. A clutch or brake construction comprising a friction block carrier, a friction block, a channel-like guiding and clamping beam-like strip for guiding and clamping said block to said carrier, and one or more screw-threaded clamping bolts having their heads seated in a channel-like strip for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip being substantially coextensive lengthwise with respect to said groove and having side flanges and said groove having inwardly extending side shoulders engageable with the flanges of said clamping strip, said heads being wedge-like and engaging the outer edges of the channel tending to spread it.

5. For use with a clutch or brake construction comprising a friction block carrier and a friction block, a guiding and clamping beam-like strip for guiding and clamping said block to said carrier, and one or more screw-threaded clamping bolts for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip being substantially coextensive lengthwise with respect to said groove and having side flanges and said groove having inwardly extending side shoulders engageable with the flanges of said clamping strip, said flanges having longitudinally extending ribs for pressing into said shoulders to hold them in place in case the block becomes divided.

6. For use with a clutch or brake construction comprising a friction block carrier and a friction block, a channel-like guiding and clamping beam-like strip for guiding and clamping said block to said carrier, and one or more screw-threaded clamping bolts having their heads seated in a channel-like strip for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip being substantially coextensive lengthwise with respect to said groove and having side flanges and said groove having inwardly extending side shoulders engageable with the flanges of said clamping strip, said heads being wedge-like and engaging the outer edges of the channel tending to spread it.

7. A clutch or brake construction comprising a friction block carrier, a friction block, a guiding and clamping beam-like strip for guiding and clamping said block to said carrier, and one or more screw-threaded clamping bolts for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface for engaging and receiving said guiding and clamping strip, said strip being substantially coextensive lengthwise with respect to said groove and having side flanges and said groove having inwardly extending side shoulders engageable with the flanges of said clamping strip, the engaging surfaces of said side flanges and side shoulders being substantially in a plane parallel to the engaging surfaces of said friction block and block carrier to avoid spreading action of the side shoulders and to hold the portions of the friction block in position.

8. A clutch or brake construction comprising a friction block carrier, a friction block, a guiding and clamping beam-like strip for guiding and clamping said block to said carrier, and one or more screw-threaded clamping bolts for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface for engaging and receiving said guiding and clamping strip, said strip being substantially coextensive lengthwise with respect to said groove and having side flanges and said groove having inwardly extending side shoulders engageable with the flanges of said clamping strip, the engaging surfaces of said side flanges and side shoulders being substantially in a plane parallel to the engaging surfaces of said friction block and block carrier to avoid spreading action of the side shoulders and to hold the portions of the friction block in position, said flanges having longitudinally extending ribs for pressing into said shoulders to hold them in place in case the block is divided.

9. A clutch or brake construction comprising a friction block carrier, a friction block, a channel-like guiding and clamping beam-like strip for guiding and clamping said block to said carrier, and one or more screw-threaded clamping bolts for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface for engaging and receiving said guiding and clamping strip, said strip being substantially coextensive lengthwise with respect to said groove and having side flanges and said groove having inwardly extending side shoulders engageable with the flanges of said clamping strip, the engaging surfaces of said side flanges and side shoulders being substantially in a plane parallel to the engaging surfaces of said friction block and block carrier to avoid spreading action of the side shoulders and to hold the portions of the friction block in position.

10. A clutch or brake construction comprising a friction block carrier, a friction block, a channel-like guiding and clamping beam-like strip for guiding and clamping said block to said carrier, and one or more screw-threaded clamping bolts having their heads seated in said channel-like strip for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface for engaging and receiving said guiding and clamping strip, said strip being substantially coextensive lengthwise with respect to said groove and having side flanges and said groove having inwardly extending side shoulders engageable with the flanges of said clamping strip, the engaging surfaces of said side flanges and side shoulders being substantially in a plane parallel to the engaging surfaces of said friction block and block carrier to avoid spreading action of the side shoulders and to hold the portions of the friction block in position.

11. A clutch or brake construction comprising a friction block carrier, a friction block, a channel-like guiding and clamping beam-like strip for guiding and clamping said block to said carrier, and one or more screw-threaded clamping bolts having their heads seated in said channel-like strip for drawing said strip toward said carrier, said friction block having coaxial face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface for engaging and receiving said guiding and clamping strip, said strip being substantially coextensive lengthwise with respect to said groove and having side flanges and said groove having inwardly extending side shoulders engageable with the flanges of said clamping strip, the engaging surfaces of said side flanges and side shoulders being substantially in a plane parallel to the engaging surfaces of said friction block and block carrier to avoid spreading action of the side shoulders and to hold the portions of the friction block in position, said heads being wedge-like and engaging the outer edges of the channel tending to spread it.

12. For use with a clutch or brake construction comprising a friction block carrier, a friction block, and one or more screw-threaded clamping bolts for drawing said strip toward said carrier, a beam-like guiding and clamping strip for guiding and clamping said block to said carrier, said friction block having coaxial sectoral face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip having side flanges and said groove having inwardly extending side shoulders engageable with the flanges of said clamping strip, said flanges having longitudinally extending ribs for pressing into said shoulders to hold them in place in case the block becomes divided.

13. For use with a clutch or brake construction comprising a friction block carrier, a friction block, and one or more clamping bolts having their heads seated in a channel-like strip for drawing said strip toward said carrier, a beam-like channel-like guiding and clamping strip for guiding and clamping said block to said carrier, said friction block having coaxial sectoral face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip having side flanges and said groove having inwardly extending side shoulders engageable with the flanges of said clamping strip, said heads being wedge-like and engaging the outer edges of the channel tending to spread it.

14. For use with a clutch or brake construction comprising a friction block carrier, a friction block, and a beam-like channel-like guiding and clamping strip for guiding and clamping said block to said carrier, one or more clamping bolts having their heads seated in a channel-like strip for drawing said strip toward said carrier, said friction block having coaxial sectoral face and back surfaces, said face surface being a friction surface for frictionally engaging a complementary relatively rotatable friction surface to check relative rotation between said surfaces about a common axis, said carrier having a surface for engagement with the back surface of said block, said block having one or more grooves in its back carrier-engaging surface extending longitudinally of said axis and extending completely across said back surface for engaging and receiving said guiding and clamping strip, said strip having side flanges and said groove having inwardly extending side shoulders engageable with the flanges of said clamping strip, said heads being wedge-like and engaging the outer edges of the channel tending to spread it.

HANS R. AMUNDSEN.

REFERENCES CITED

The following references are of record in the file of this patent:

UNITED STATES PATENTS

| Number | Name | Date |
|---|---|---|
| Re. 20,485 | MacLean | Aug. 24, 1937 |
| 1,467,656 | Sturt | Sept. 11, 1923 |
| 2,402,005 | Amundsen | June 11, 1946 |

FOREIGN PATENTS

| Number | Country | Date |
|---|---|---|
| 517,557 | Great Britain | Feb. 1, 1940 |
| 757,380 | France | Dec. 26, 1933 |